United States Patent
Van Alen

(10) Patent No.: US 9,957,891 B2
(45) Date of Patent: May 1, 2018

(54) FUEL MANIFOLD COOLING FLOW RECIRCULATION

(75) Inventor: Frederick Ehrwulf Van Alen, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1201 days.

(21) Appl. No.: 13/517,635

(22) Filed: Jun. 14, 2012

(65) Prior Publication Data

US 2013/0061599 A1    Mar. 14, 2013

Related U.S. Application Data

(60) Provisional application No. 61/532,924, filed on Sep. 9, 2011.

(51) Int. Cl.
 *F02C 7/232* (2006.01)
 *F02C 7/12* (2006.01)
 *F02C 7/22* (2006.01)

(52) U.S. Cl.
 CPC ............... *F02C 7/12* (2013.01); *F02C 7/22* (2013.01); *F02C 7/222* (2013.01)

(58) Field of Classification Search
 CPC .... F02C 7/12; F02C 7/22; F02C 7/222; F02C 7/228; F02C 7/232; F23R 3/28; F23R 3/283
 See application file for complete search history.

(56) References Cited

U.S. PATENT DOCUMENTS

| 4,027,474 A | 6/1977 | Demase |
|---|---|---|
| 4,332,527 A | 6/1982 | Moldovan et al. |
| 4,337,616 A | 7/1982 | Downing |
| 4,903,478 A | 2/1990 | Seto et al. |
| 5,036,657 A | 8/1991 | Seto et al. |
| 5,148,671 A | 9/1992 | Kast et al. |
| 5,187,936 A | 2/1993 | Kast et al. |
| 5,231,833 A | 8/1993 | MacLean et al. |
| 5,257,502 A | 11/1993 | Napoli |

(Continued)

FOREIGN PATENT DOCUMENTS

| JP | 09504089 A | 4/1997 |
|---|---|---|
| WO | 9415084 A1 | 7/1994 |

OTHER PUBLICATIONS

PCT Search Report and Written Opinion dated Nov. 7, 2012 from corresponding Application No. PCT/IB2012/052423.

(Continued)

*Primary Examiner* — Arun Goyal
(74) *Attorney, Agent, or Firm* — General Electric Company; Pamela A. Kachur

(57) ABSTRACT

Cooling flow recirculation in fuel manifolds, such as fuel manifolds associated with gas turbine engines is disclosed. An example system for jet pump driven recirculation of manifold cooling flow according to at least some aspects of the present disclosure may include a flow split valve having a spool valve disposed therein, the flow split valve having a pilot manifold and a main manifold attached thereto; a jet pump fluidically coupled to the pilot manifold, the jet pump being arranged to drive recirculation of a cooling flow through the main manifold via a cooling flow circuit in a pilot only mode of operation; and/or a fuel nozzle in fluid communication with the pilot manifold and the main manifold.

20 Claims, 3 Drawing Sheets

(56) References Cited

U.S. PATENT DOCUMENTS

| | | |
|---|---|---|
| 5,261,222 A | 11/1993 | Napoli |
| 5,289,685 A | 3/1994 | Hoffa |
| 5,339,636 A | 8/1994 | Donnelly et al. |
| 5,404,709 A | 4/1995 | Mac Lean et al. |
| 5,406,798 A | 4/1995 | Wiesner, Jr. |
| 5,423,178 A | 6/1995 | Mains |
| 5,570,580 A | 11/1996 | Mains |
| 5,735,117 A * | 4/1998 | Toelle ................ 60/39.094 |
| 5,809,771 A | 9/1998 | Wernberg |
| 5,881,550 A | 3/1999 | Toelle |
| 5,884,483 A | 3/1999 | Munro |
| 6,357,237 B1 | 3/2002 | Candy et al. |
| 6,877,306 B2 | 4/2005 | Wernberg |
| 6,955,040 B1 * | 10/2005 | Myers, Jr. ............ F02C 7/236 60/39.281 |
| 7,007,452 B1 | 3/2006 | Baryshnikov et al. |
| 7,131,274 B2 | 11/2006 | Baryshnikov et al. |
| 7,654,088 B2 | 2/2010 | Shafique et al. |
| 8,925,322 B2 * | 1/2015 | Scully et al. .............. 60/734 |
| 2009/0077973 A1 * | 3/2009 | Hu et al. ................. 60/741 |

OTHER PUBLICATIONS

Unofficial English translation of Chinese Office Action issued in connection with corresponding CN Application No. 201280043628.9 dated Jun. 3, 2015.

Unofficial English translation of Japanese Office Action issued in connection with corresponding JP Application No. 2014-529758 dated Apr. 26, 2016.

* cited by examiner

FUEL MANIFOLD COOLING FLOW RECIRCULATION

CROSS REFERENCE TO RELATED APPLICATION

This application claims the benefit of U.S. Provisional Application No. 61/532,924, filed Sep. 9, 2011, which is incorporated by reference.

BACKGROUND

The subject matter disclosed herein relates generally to fuel systems, and, more specifically, to cooling flow recirculation in fuel manifolds, such as fuel manifolds associated with gas turbine engines.

Low emissions combustion may utilize pilot and main fuel flow circuits within a fuel nozzle. The pilot and main circuits of the fuel nozzle may each be fed by a separate pilot and main fuel manifold, respectively. There are engine operation conditions that require the main flow through the nozzles to be turned off. In such cases, reference is made to cooling a non-flowing fuel manifold. The problem: When some fuel circuits are flowing fuel and other circuits are not flowing fuel, there may be a risk of coke formation in the non-flowing circuit. For example, main flow off operation may present a risk of coke formation in the main fuel circuit. One solution to this concern is to provide cooling flow through the main circuit during pilot only operation. Prior approaches have either added significant weight and consumed needed engine envelope or resulted in unwanted fuel dynamics and limited the ability to turn on the main flow. For example, some approaches have utilized recirculation back to the pump inlet. A downside to this approach is that it requires another fitting on the nozzle, requires routing through an engine strut, and adds weight. Additionally, utilization of recirculation back to the pump inlet makes it difficult to find necessary undercowl space in implementation. This and other approaches in the art have been shown to raise concerns relative to fuel flow dynamic response, as such dynamic response can cause engine operability problems and additional challenges regarding an inability to satisfactorily flow the main fuel circuits at low total metered flows.

BRIEF DESCRIPTION

At least one solution for the above-mentioned problem(s) is provided by the present disclosure to include example embodiments, provided for illustrative teaching and not meant to be limiting. Some example embodiments according to the present disclosure may utilize a jet pump driven recirculation circuit to provide for cooling a fuel manifold in a manner that is weight effective and favorable in terms of the ability to provide main flow and fuel system dynamic response. Additionally, some example embodiments may provide robust fuel delivery at all required flow rates while remaining weight-effective and providing superior cooling performance with respect to alternative approaches.

An example system for jet pump driven recirculation of manifold cooling flow according to at least some aspects of the present disclosure may include a flow split valve having a spool valve disposed therein, the flow split valve having a pilot manifold and a main manifold attached thereto; a jet pump fluidically coupled to the pilot manifold, the jet pump being arranged to drive recirculation of a cooling flow through the main manifold via a cooling flow circuit in a pilot only mode of operation; and/or a fuel nozzle in fluid communication with the pilot manifold and the main manifold.

An example fuel system according to at least some aspects of the present disclosure may include a pilot manifold fluidically coupled between a flow split valve and a fuel nozzle; a main manifold fluidically coupled between the flow split valve and the fuel nozzle; a jet pump operatively disposed in fluid communication with the pilot manifold such that a pilot flow stream from the flow split valve to the fuel nozzle through the pilot manifold flows through the jet pump and creates a low static pressure area therein; a cooling flow circuit operatively coupling the main manifold and the low static pressure area of the jet pump; and/or a cooling flow connector operatively coupling the main manifold and the pilot manifold downstream of the jet pump. In a pilot only mode, a cooling flow may be established from the pilot manifold, through the cooling flow connector, through the main manifold toward the flow split valve, and through the cooling flow circuit to the low static pressure area of the jet pump. In a main plus pilot mode, a main flow stream may be established in the main manifold from the flow split valve to the fuel nozzle.

An example method of operating a fuel system according to at least some aspects of the present disclosure may include directing a pilot flow stream from a flow split valve to a fuel nozzle via a pilot manifold, the pilot manifold including a jet pump fluidically coupled thereto such that the pilot flow stream through the jet pump creates a low static pressure area within the jet pump; upon selection of a pilot only mode, providing a cooling flow through a main manifold from approximate the fuel nozzle to the flow split valve, including directing the cooling flow from the pilot manifold to the main manifold approximate the fuel nozzle and directing the cooling flow from the flow split valve to the low static pressure area of the jet pump via a cooling flow circuit; and upon selection of a main plus pilot mode, providing a main flow stream from the flow split valve to the fuel nozzle via the main manifold.

BRIEF DESCRIPTION OF THE DRAWINGS

The subject matter for which patent claim coverage is sought is particularly pointed out and claimed herein. The subject matter and embodiments thereof, however, may be best understood by reference to the following description taken in conjunction with the accompanying drawing figures in which:

DETAILED DESCRIPTION

Figure 1:
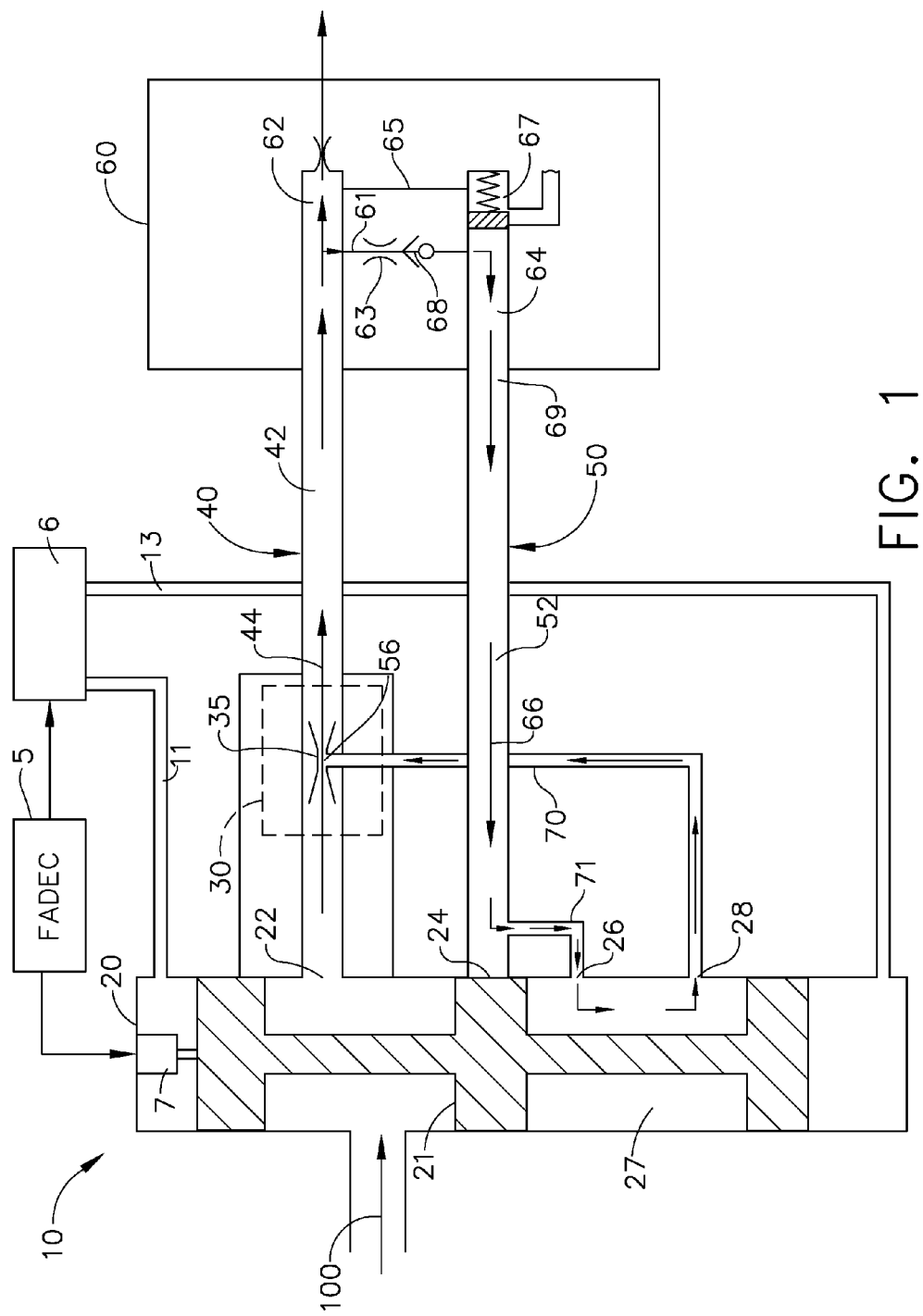
FIG. 1 is a schematic diagram of an example system showing pilot flow operation with cooling flow activated.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure includes, inter alia, fuel systems, and, more specifically, cooling flow recirculation in fuel manifolds, such as fuel manifolds associated with gas turbine engines.

Figure 2:
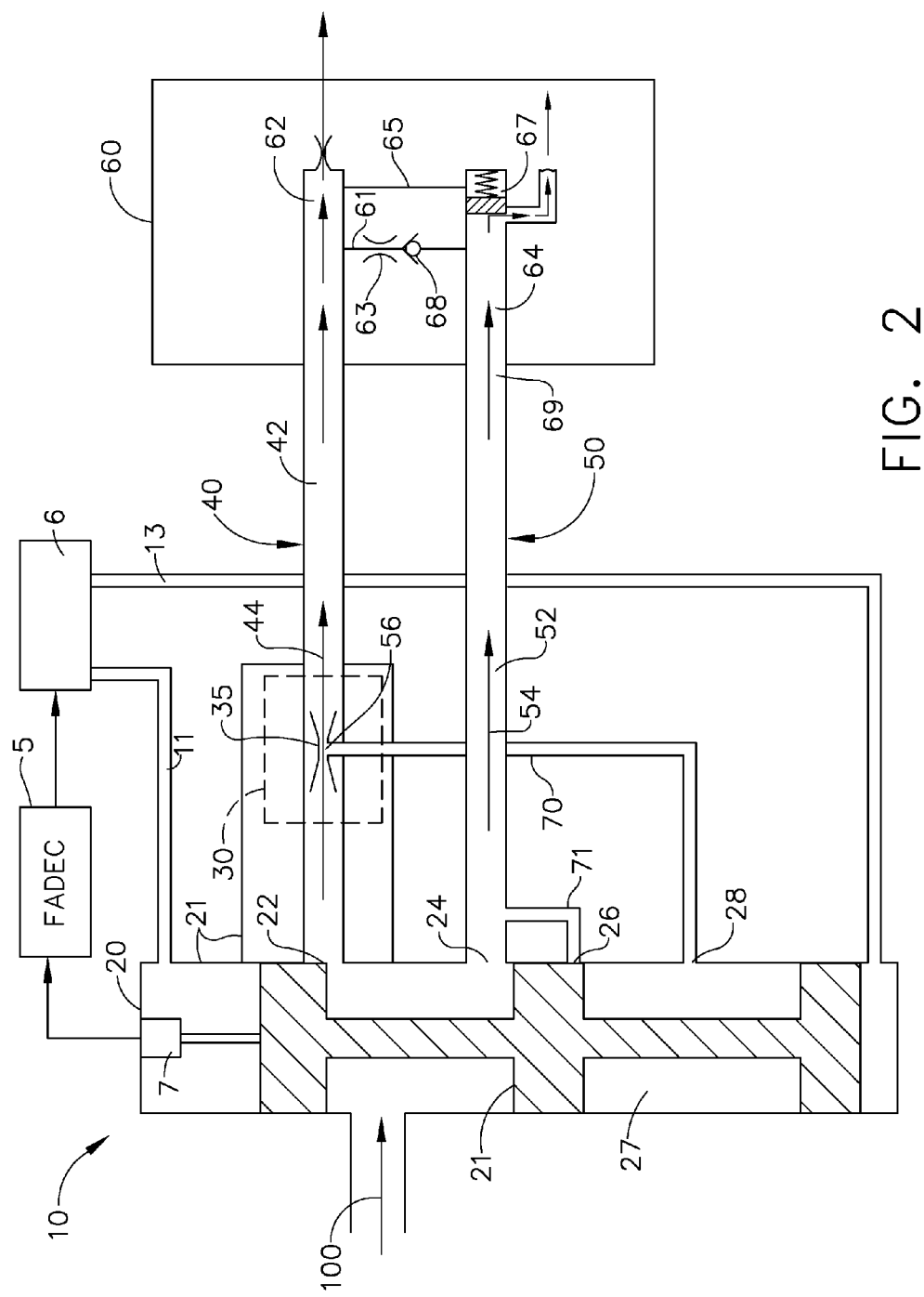
FIG. 2 is schematic diagram of an example system showing pilot flow operation combined with main flow operation with cooling flow deactivated.

Referring to the drawings wherein identical reference numerals denote the same elements throughout the various views, FIGS. 1 and 2 show, in general, an example system 10 for jet pump driven recirculation of manifold cooling flow. System 10 may comprise a flow split valve 20, a jet pump 30, one or more manifolds, one or more fuel nozzles 60, and/or a cooling flow circuit 70. Embodiments include those wherein the flow split valve 20 has two manifolds attached thereto: a pilot manifold 40 (which may be fluidically coupled between the flow split valve 20 and the fuel nozzle 60) and a main manifold 50 (which may be fluidically coupled between the flow split valve 20 and the fuel nozzle 60). Further embodiments include those wherein the flow split valve 20 has a spool valve 21 disposed therein that routes fuel as desired to a pilot fuel circuit 42 and a main fuel circuit 52 corresponding to pilot manifold 40 and main manifold 50, respectively. The jet pump 30 may be fluidically coupled to the pilot manifold and/or may be associated with the structure containing the flow split valve 20. For example, the jet pump 30 may be disposed within a housing 21 of the flow split valve 20 and/or the jet pump 30 may be in fluid communication with the pilot manifold 40 as desired. In some example embodiments, the jet pump 30 may be disposed separate from, but fluidically connected to, the housing 21 of the flow split valve 20. Further alternatives provide that the main manifold 50 is attached to and placed into fluid communication with the flow split valve 20 as desired. The one or more fuel nozzles 60 are attached to and placed into fluid communication with the manifolds 40, 50 as desired.

Referring to FIG. 1, a total flow 100 is received from generally upstream of flow split valve 20 (e.g., from a fuel pump) and then enters the flow split valve 20. At least a portion of the total flow 100 received by the flow split valve 20 is routed downstream to the pilot manifold 40 and the pilot fuel circuit 42, becoming a pilot flow stream 44. The flow split valve 20 may be configured to route the total flow 100 provide for fuel flow through either the pilot fuel circuit 42 only (pilot only mode) or fuel flow through both the pilot fuel circuit 42 and the main fuel circuit 52 (main plus pilot mode).

With further reference to FIG. 1, when pilot only operation is desired, the spool valve 21 within the flow split valve 20 is positioned by a full authority digital engine control (FADEC) 5 such that substantially all of the total flow 100 entering the valve 20 is metered and routed to the pilot manifold 40. The spool valve 21 within the flow split valve 20 isolates the pilot flow stream 44 from the main manifold 50 by blocking fuel from entering a main flow control port 24, which fluidically couples the main manifold 50 to the flow split valve 20 and which may be disposed within the flow split valve 20. The pilot flow stream 44 passes through a venturi 35 of the jet pump 30 thereby creating a low static pressure area 56 relative to the total pressure of the pilot flow stream 44. The low pressure area 56 of the jet pump 30 is connected to the cooling flow circuit 70. In further detail, a cooling flow chamber 27 is disposed within the flow split valve 20. The cooling flow circuit 70 connects the venturi 35 to the cooling flow chamber 27. A cooling flow exit port 28 is formed on valve 20 and it is at this port 28 that the cooling flow chamber 27 is connected to the venturi 35. An additional section of cooling flow circuit 70, bypass 71, connects the main manifold 50 to the flow split valve 20 through a control port 26, bypassing main manifold flow port 24. A resulting pressure differential created by the jet pump 30 drives cooling flow 66 from a pilot portion 62 of the fuel nozzle 60 through a cooling flow connector 61 which operatively couples the pilot portion 62 of fuel nozzle 60 to the main portion 64 of fuel nozzle 60 upstream of a main nozzle metering valve 67. Cooling flow connector 61 may include a cooling flow orifice 63 and/or a cooling flow check valve 68. The main nozzle metering valve 67 is pressure referenced to the pressure seen at the pilot portion 62 of fuel nozzle 60, such as by a metering valve reference line 65.

The cooling flow 66 exits a fuel nozzle main flow inlet 69 in the reverse direction (e.g., towards the split flow valve 20) that flow would normally follow to the main portion 64 of fuel nozzle 60 and flows back through the main manifold 50, through the control port 26 on the flow split valve 20, and flows back into the low pressure area 35 of the jet pump 30 where it mixes with the pilot flow stream 44. In other words, the cooling flow 66 through the main manifold 50 in the pilot only mode and the main flow stream 54 in the main plus pilot mode (e.g., FIG. 2) may be in substantially opposite directions.

Referring to FIG. 2, when pilot plus main flow operation is desired, the spool valve 21 within the flow split valve 20 is positioned by the FADEC 5 such that fuel continues to be routed through the pilot fuel circuit 42 in the pilot manifold 40 as desired. In addition, a desired portion of the total flow 100 is also metered by the spool valve 21 within the valve 20 and thereby routed into the main manifold 50 through the main flow control port 24, thereby becoming main flow stream 54. This is accomplished by the FADEC 5 controlling the spool 21 and causing spool 21 to displace sufficiently to cause an increase in the restriction of the pilot port 22 and at the same time, causing a decrease in the restriction of the main flow control port 24. When the spool 21 within the flow split valve 20 is positioned to allow main flow 54 it also blocks fuel from entering the cooling flow port 26 which, if not blocked, would otherwise connect the low static pressure area 56 of the jet pump 30 to the main fuel manifold 50. Thus, in the main plus pilot mode, the spool valve 21 may be positioned to substantially block the cooling flow circuit 70. Referencing the pressure at the main portion 64 of fuel nozzle 60 to the pressure at the pilot portion 62 of fuel nozzle 60 results in the main pressure being higher than the pilot pressure during pilot plus main flow operation, thereby causing the closing of the cooling flow check valve 68 connecting the pilot manifold 40 and the main fuel nozzle 64.

Embodiments include those wherein the jet pump 30 having venturi 35 is inserted into the pilot flow stream 44 in order to create the low static pressure area 56 relative to the pilot flow stream 44 thereby providing for cooling flow 66 to be driven though the main fuel circuit 52 of main manifold 50 when main flow 54 is turned off Included in this system may be orifice 63 disposed in fluid communication between the pilot and main nozzles to control the amount of flow and/or a one way check-valve 68 to allow recirculation cooling flow 66 through fuel nozzle main flow inlet 69 from the pilot portion 62 as well as the main portion 64 of fuel nozzle 60 to the main manifold 50 and main fuel circuit 52 through the nozzle 60 from the pilot portion 62 of the nozzle 60 during pilot only operation as shown in FIG. 1. When it is desired to turn off recirculation cooling flow 66, alternatives provide for the addition of a separate port 26 in the flow split valve 20 in order to allow cooling flow 66 to be pass or not pass, as desired, through fuel nozzle main flow inlet 69. A control system such as a FADEC 5 is used to provide a desired flow split wherein the cooling flow circuit 70 is placed into selectable ranges of fluid communication in connecting the flow split valve 20 to the low static pressure area 56 of the jet pump 30 through venturi 35. As the main flow stream 54 enters the fuel nozzle 60 it increases the pressure in the main portion 64 of the fuel nozzle 60 such that the check valve 68 closes. This isolates the main flow 54 from the pilot flow 44 in the nozzle 60 thereby allowing the addition of main flow 54 to the total fuel that is routed through nozzle 60.

In some example embodiments according to at least some aspects of the present disclosure, FADEC 5 control logic may determine desired pilot and main flows in the fuel nozzle. The FADEC 5 may translate the desired flows into a commanded spool valve 21 position. The FADEC 5 may provide closed loop control of the spool valve 21 position by sending torquemotor current to a servo valve 6 based on the commanded position and/or the spool valve 21 position, which may be provided by a linear variable differential transformer (LVDT) 7 operatively connected to the spool valve 21. The servo valve 6 may provide a servo flow via one or more of conduit 11 and conduit 13, which may move the spool valve 21 to the commanded position.

Figure 3:
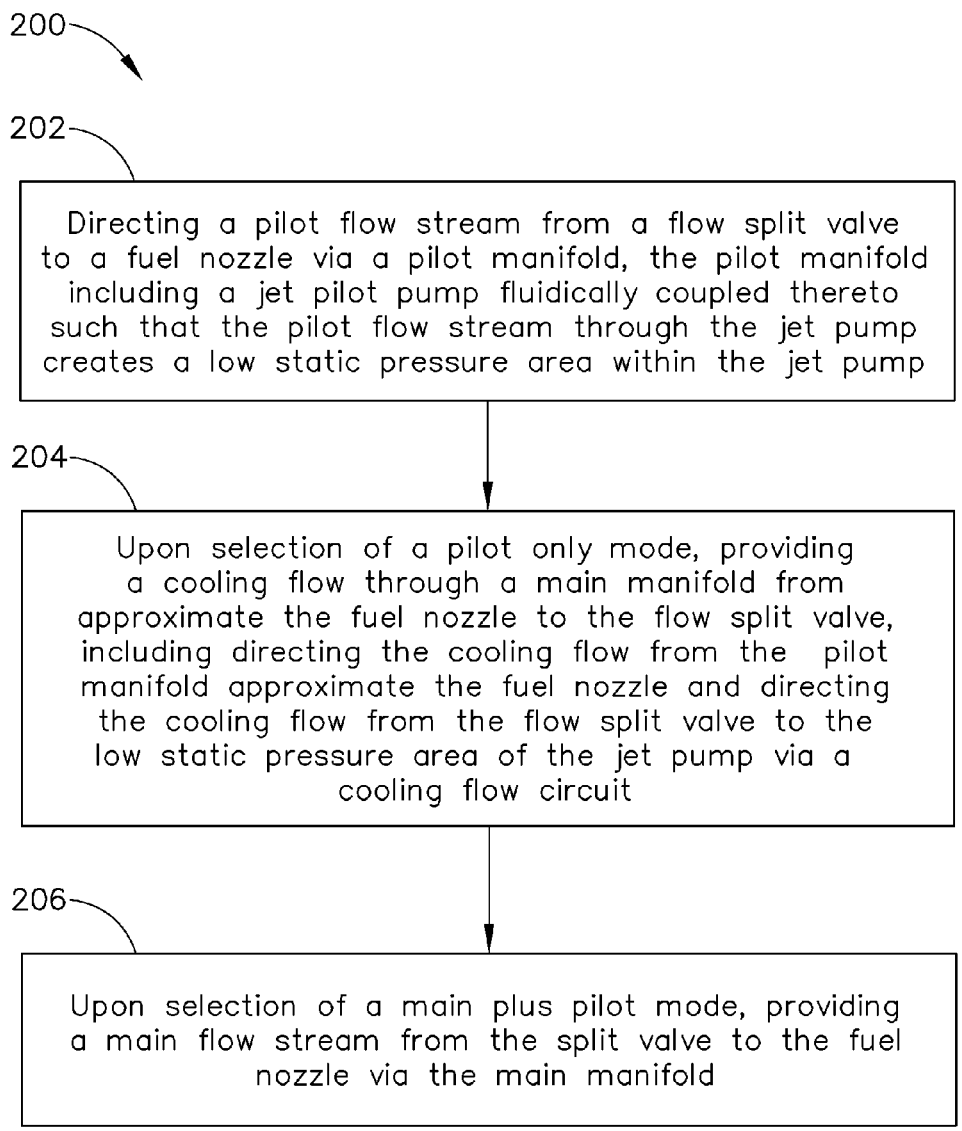
FIG. 3 is a flow diagram illustrating an example method of operating a fuel system, all in accordance with at least some aspects of the present disclosure.

FIG. 3 is a flow diagram illustrating an example method 200 of operating a fuel system according to at least some aspects the present disclosure. Method 200 may include an operation 202, which may include directing a pilot flow stream from a flow split valve to a fuel nozzle via a pilot manifold, the pilot manifold including a jet pump operatively disposed therein such that the pilot flow stream through the jet pump creates a low static pressure area within the jet pump. Operation 202 may be followed by an operation 204, which may include, upon selection of a pilot only mode, providing a cooling flow through a main manifold from approximate the fuel nozzle to the flow split valve, including directing the cooling flow from the pilot manifold to the main manifold approximate the fuel nozzle and directing the cooling flow from the flow split valve to the low static pressure area of the jet pump via a cooling flow circuit. Operation 204 may be followed by an operation 206, which may include, upon selection of a main plus pilot mode, providing a main flow stream from the flow split valve to the fuel nozzle via the main manifold.

In some example methods, in the pilot only mode, the cooling flow may flow through a cooling flow chamber of the flow split valve. The cooling flow through the main manifold in the pilot only mode and the main flow stream through the main manifold in the main plus pilot mode may be in substantially opposite directions. Providing the cooling flow through the main manifold may include flowing the cooling flow through a bypass from the main manifold to the flow split valve, the bypass bypassing a main manifold flow port connecting the flow split valve and the main manifold. Method 200 may further include selecting the pilot only mode or the main plus pilot mode using a FADEC. Selecting the pilot only mode or the main plus pilot mode using a FADEC may comprise positioning a spool valve associated with the flow split valve.

While specific embodiments of the system for jet pump driven recirculation of manifold cooling flow have been described, it will be apparent to those skilled in the art that various modifications thereto can be made without departing from the spirit and scope of the invention as defined in the appended claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for jet pump driven recirculation of manifold cooling flow comprising:
   a flow split valve having a spool valve disposed therein, wherein the spool valve divides the flow split valve into a fuel chamber and a cooling flow chamber;
   the flow split valve having a pilot manifold and a main manifold attached thereto, wherein:
   in a first position of the spool valve defining a pilot only mode, the fuel chamber is in fluid communication with the pilot manifold and the cooling flow chamber is in fluid communication with the main manifold, and
   in a second position of the spool valve defining a main plus pilot mode, the fuel chamber in fluid communication with both the pilot manifold and the main manifold, and the spool valve blocks fluid communication between the cooling flow chamber and the main manifold;
   a jet pump fluidically coupled to the pilot manifold, the jet pump being arranged to drive recirculation of a cooling fuel flow from the pilot manifold through the main manifold and through the cooling flow chamber defining a cooling flow circuit with a loop path in the pilot only mode of operation; and
   a fuel nozzle in fluid communication with the pilot manifold and the main manifold.

2. The system for jet pump driven recirculation of manifold cooling flow of claim 1,
   wherein a total flow is received from upstream of the flow split valve and enters the flow split valve; and
   wherein at least a portion of the total flow received by the flow split valve is routed downstream to the pilot manifold, thereby becoming a pilot flow stream.

3. The system for jet pump driven recirculation of manifold cooling flow of claim 2, wherein the spool valve is configured to route the total flow to (a) the pilot manifold only in the pilot only mode and (b) to both the pilot manifold and the main manifold in the main plus pilot mode.

4. The system for jet pump driven recirculation of manifold cooling flow of claim 3,
   wherein the main manifold is fluidically coupled to the flow split valve by a main manifold flow control port,
   wherein the cooling flow circuit includes a bypass connecting the main manifold to the flow split valve bypassing the main manifold flow control port, and
   wherein, in the pilot only mode, the spool valve blocks the main manifold flow control port and the cooling flow flows through the bypass.

5. The system for jet pump driven recirculation of manifold cooling flow of claim 2, wherein, in the pilot only mode, the spool valve is positioned by a FADEC such that all of the total flow entering the flow split valve is metered and routed to the pilot manifold, wherein, in the pilot only mode, the spool valve blocks the total flow from entering a main manifold flow port disposed within the flow split valve, wherein the pilot flow stream passes through a venturi of the jet pump thereby creating a low static pressure area relative to the total pressure of the pilot flow stream, and wherein the low static pressure area of the jet pump is connected to the cooling flow circuit.

6. The system for jet pump driven recirculation of manifold cooling flow of claim 2, wherein, in the main plus pilot mode, the spool valve is positioned by the FADEC such that fuel continues to be routed through a pilot fuel circuit in the pilot manifold, and wherein, in the main plus pilot mode, a portion of the total flow is metered by the spool valve and is routed into the main manifold, thereby becoming a main flow stream.

7. The system for jet pump driven recirculation of manifold cooling flow of claim 1, wherein the fuel nozzle comprises a main nozzle metering valve fluidically coupled to the main manifold; and wherein the main nozzle metering valve is pressure referenced to the pilot manifold approximate the fuel nozzle.

8. The system for jet pump driven recirculation of manifold cooling flow of claim 7, wherein, in the pilot only mode, the cooling flow in the main manifold flows from the fuel nozzle towards the flow split valve.

9. A fuel system, comprising:

a pilot manifold fluidicaily coupled between a flow split valve and a fuel nozzle, the flow split valve having a spool valve disposed therein, wherein the spool valve divides the flow split valve into a fuel chamber and a cooling flow chamber;

a main manifold fluidically coupled between the flow split valve and the fuel nozzle; wherein in a first position of the spool valve defining pilot only mode, the fuel chamber is in fluid communication with the pilot manifold and the cooling flow chamber is in fluid communication with the main manifold, and in a second position of the spool valve defining a main plus pilot mode, the fuel chamber in fluid communication with both the pilot manifold and the main manifold, and the spool valve blocks fluid communication between the cooling flow chamber and the main manifold:

a jet pump operatively disposed in fluid communication with the pilot manifold such that a pilot flow stream from the flow split valve to the fuel nozzle through the pilot manifold flows through the jet pump and creates a low static pressure area therein;

a cooling flow circuit operatively coupling the main manifold and the low static pressure area of the jet pump through the cooling flow chamber; and a cooling flow connector operatively coupling the main manifold and the pilot manifold downstream of the jet pump;

wherein, in the pilot only mode, a cooling fuel flow is established with a loop path from the pilot manifold, through the cooling flow connector, through the main manifold toward the flow split valve, and through the cooling flow circuit to the low static pressure area of the jet pump; and wherein, in the main plus pilot mode, a main flow stream is established in the main manifold from the fuel chamber of the flow split valve to the fuel nozzle.

10. The fuel system of claim 9, wherein, in the pilot only mode, a cooling flow stream flows through the cooling flow chamber of the flow split valve, and wherein the cooling flow connector further comprises a cooling flow orifice, the cooling flow orifice controlling an amount of the cooling flow stream between the pilot manifold and the main manifold.

11. The system of claim 10, further comprising a main nozzle metering valve fluidically coupled to the main manifold downstream of the cooling flow connector, the main nozzle metering valve being pressure referenced to the pilot manifold approximate the fuel nozzle, and wherein the flow connector further comprises a one-way checkvalve, the one-way checkvalve preventing flow in a direction from the main manifold to the pilot manifold via the flow connector.

12. The fuel system of claim 11, wherein the jet pump is disposed within a housing of the flow split valve, and wherein in the pilot only mode, the one-way checkvalve is located downstream of the cooling flow orifice.

13. The fuel system of claim 9, wherein a cooling flow stream through the main manifold in the pilot only mode and the main flow stream through the main manifold in the main plus pilot mode are in opposite directions.

14. The fuel system of claim 9, wherein the main manifold is fluidically coupled to the flow split valve by a main flow control port, wherein the cooling flow circuit includes a bypass connecting the main manifold to the flow split valve bypassing the main flow control port, and wherein, in the pilot only mode, the spool valve blocks the main flow control port and a cooling flow stream flows through the bypass.

15. A method of operating a fuel system comprising:

a flow split valve having a spool valve disposed therein, wherein the spool valve divides the flow split valve into a fuel chamber and a cooling flow chamber; wherein in a first position of the spool valve defining a pilot only mode, the fuel chamber is in fluid communication with a pilot manifold and the cooling flow chamber is in fluid communication with a main manifold, and in a second position of the spool valve defining a main plus pilot mode, the fuel chamber in fluid communication with both the pilot manifold and the main manifold, and the spool valve blocks communication between the cooling flow chamber and the main manifold;

the method comprising:

directing a pilot flow stream from the fuel chamber of the flow split valve to a fuel nozzle via the pilot manifold, the pilot manifold including a jet pump fluidically coupled thereto such that the pilot flow stream through the jet pump creates a low static pressure area within the jet pump;

upon selection of the pilot only mode, providing a cooling fuel flow through the main manifold from approximate the fuel nozzle to the cooling flow chamber of the flow split valve with a loop path, including directing the cooling fuel flow from the pilot manifold to the main manifold approximate the fuel nozzle and directing the cooling fuel flow from the cooling flow chamber of the flow split valve to the low static pressure area of the jet pump via a cooling flow circuit; and upon selection of the main plus pilot mode, providing a main flow stream from the fuel chamber of the flow split valve to the fuel nozzle via both the pilot manifold and the main manifoid.

16. The method of claim 15, wherein, in the pilot only mode a cooling flow stream flows through the cooling flow chamber of the flow split valve.

17. The method of claim 15, wherein, a cooling flow stream through the main manifold in the pilot only mode and the main flow stream through the main manifold in the main plus pilot mode are in opposite directions.

18. The method of claim 15, wherein providing a cooling flow stream through the main manifold includes flowing the cooling flow stream through a bypass from the main manifold to the flow split valve, the bypass bypassing a main manifold flow port connecting the flow split valve and the main manifold.

19. The method of claim 15, further comprising selecting the pilot only mode or the main plus pilot mode using a FADEC.

20. The method of claim 19, wherein selecting the pilot only mode or the main plus pilot mode using the FADEC comprises positioning the spool valve associated with the flow split valve, wherein the spool valve is operatively connected to a linear variable differential transformer (LVDT), wherein the linear variable differential transformer (LVDT) is communicatively coupled to at least one servo valve, wherein the at least one servo valve is communicatively coupled to the FADEC, and wherein the FADEC provides closed loop control of the spool valve position by sending torquemeter current to the servo valve.

* * * * *